June 17, 1941.     F. M. ASPIN     2,245,743
ROTARY VALVE
Filed Feb. 24, 1939     2 Sheets-Sheet 1

Inventor:
Frank M. Aspin
By his Attorney: Walter Gunn

Patented June 17, 1941

2,245,743

UNITED STATES PATENT OFFICE 2,245,743

ROTARY VALVE

Frank Metcalf Aspin, Bury, England

Application February 24, 1939, Serial No. 258,224
In Great Britain July 23, 1935

6 Claims. (Cl. 123—190)

This invention relates to rotary valve assemblies, for example for internal combustion engines of the kind having a rotary valve member in the form of a conical or other tapered external shape of a volume of revolution about the axis of rotation, which external surface coacts with a correspondingly shaped internal surface in a housing in which it rotates, the said coacting surfaces together forming a gas seal and the principal pressure on the valve member being axial and in the direction to load the coacting surfaces. The rotary valve improvements of this invention are also applicable to compressors, pumps, steam engines and other apparatus.

An example of the kind of engine above referred to is described in my application, Serial No. 89,115, filed July 6, 1936, to which type of engine this invention is particularly applicable, though it must be clearly understood that this invention is not restricted to such application.

It is an object of this invention to provide a rotary valve assembly with an anti-friction thrust bearing and an oil film between the conical coacting surfaces so that the load acting in an axial direction on the valve member may be distributed between the thrust bearing and the oil film. The anti-friction thrust bearing may be provided with either roller bearings or ball bearings of such size and number that they may yield sufficiently due to their resiliency to permit the valve member to move in its axial direction due to the pressure or load thereon. The valve assembly is so constructed, proportioned and arranged that, when there is little or no load on the valve member, there is an appreciable clearance between the conical coacting surfaces to provide for the oil film, and when the valve member is loaded, as when it is subjected to relatively great pressure, the thrust bearing yields and permits the load to be distributed between the thrust bearing and the oil film. This invention prevents overload of the thrust bearing.

According to the invention the valve member is constructed and adjusted as to its anti-friction thrust bearing, and the conical coacting surfaces so that the yield of the anti-friction bearing within the limits of its safe working loads, permits with increase of load such axial movement of the valve member, as will enable an increasing proportion of the load to be taken on the said oil film between the conical coacting surfaces.

According to a further feature of the invention, an anti-friction thrust bearing is selected, such as a conical roller bearing, having an axial movement owing to the inclination of its bearing surfaces greater than the actual compression of its bearing surfaces measured in a direction normal thereto.

Figures 1, 2:
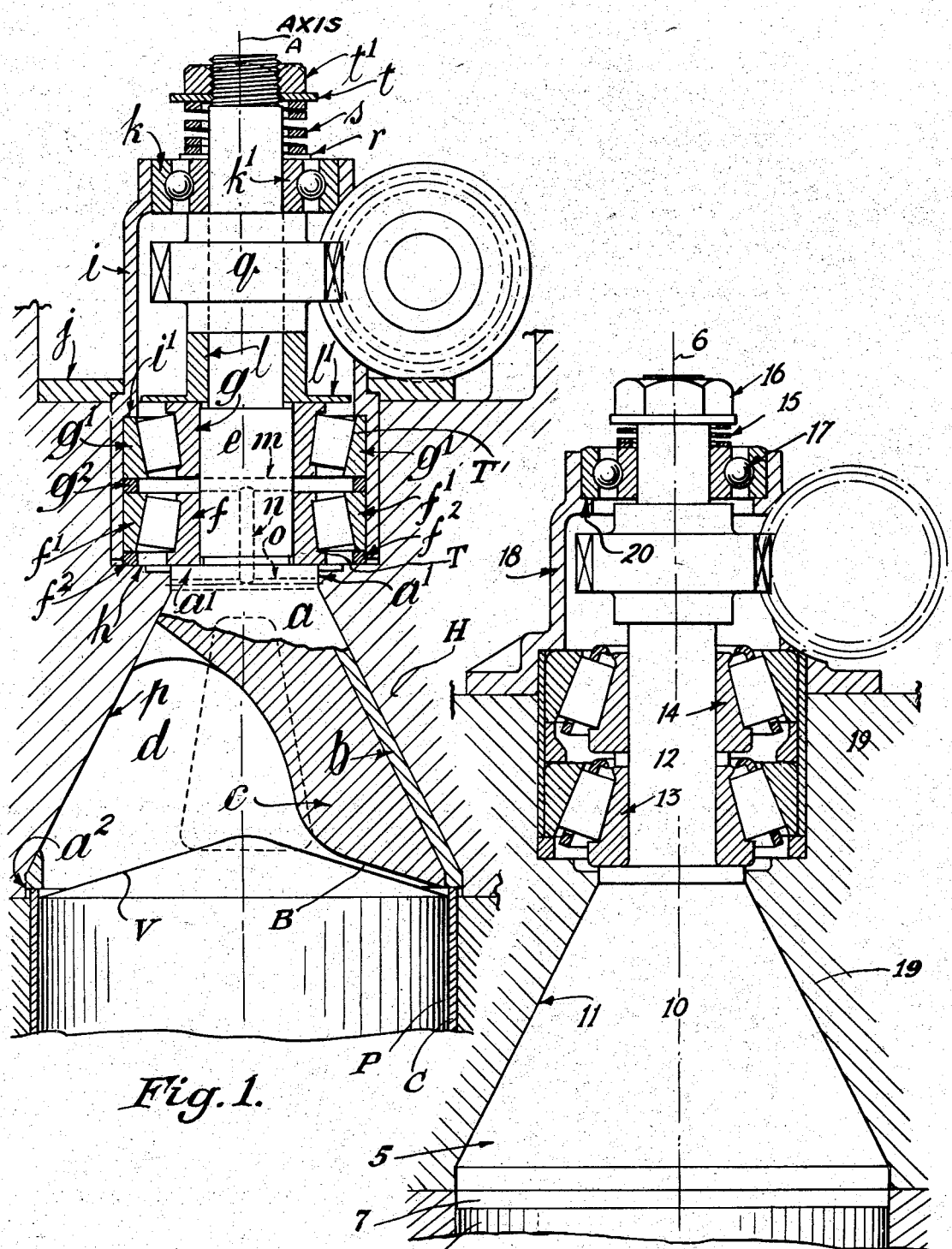
Fig. 1 is a longitudinal part sectional view showing a rotary valve assembly made in accordance with one example of the invention.
Fig. 2 shows a modified construction of the valve assembly shown in Fig. 1.

As illustrated in Fig. 1, the rotary valve assembly has a rotary valve member V having a conical head $a$ of an angle of 60 degrees (included angle), such head being substantially only a steel shell $b$ about $\frac{3}{32}$ inch thick, filled with a core of aluminium $c$, in which an eccentric valve chamber $d$ is formed in accordance with my aforesaid application. This construction is adopted partly to reduce the weight of the eccentric mass, but it also has other advantages. This conical head is approximately 3⅝ inches diameter at its lower or larger end, and 1¼ inches diameter at its upper or smaller end, and at each end merges into a short cylindrical portion $a^1$ and $a^2$ about ⅛ inch long. The shaft or stem $e$ about which the valve rotates, is formed integral with the shell $b$ of the head part $a$ above described, and extending coaxially from the smaller end thereof and adjacent to such end, it is ground to receive the inner races $f$ and $g$ of a pair of thrust bearings T and T'' preferably in the form of conical roller bearings. These roller bearings are selected from manufacturers' standard sizes, and are arranged so that the inner race of the lower bearings is conical in the same direction as the head of the valve, whilst the other is oppositely arranged. The lower bearing is selected for size, so as to be capable of taking about one-third of the maximum calculated load during combustion, estimated from the calculated explosion pressures. The inner race $f$ of the lower bearing rests against the shoulder formed at the junction of the shaft $e$, with the smaller cylindrical end $a^1$ of the head part. The inner race $g$ is made an easy push fit on the shaft $e$, so that wear at the conical surfaces of the valve member may automatically be taken up, as explained hereafter. The outer races $f^1$ and $g^1$ are supported on a shoulder $h$ of the housing H, in which the valve member rotates, there being a spacing ring $f^2$ between the race $f^1$ and such shoulder, and also a similar ring $g^2$ between the two outer races. These bearings are standard commercial articles having a specified angle measured in the accepted manner on the axes of their rollers of about 20 degrees, and the outer races are located in the end of a steel shell $i$, fitted into a recess in the upper end of the valve housing, such shell having a shoulder $i^1$ adapted to engage the upper face of the outer race $g^2$ of the upper bearing, so as to position and finally secure the outer races against end movement, the shell $i$ being secured to the housing by a suitable plate $j$, engaging an outer shoulder on the shell and bolted to the top of the housing. At its upper end this steel shell is adapted to hold the outer race $k$ of a ball bearing. On the shaft $e$ above the inner race $g$ of the upper conical bearing, is a collar $l$, which has an easy sliding fit on the shaft and has a flange $l^1$ engaging the said upper race and extending in diameter almost to the wall of the steel shell $i$, so as to enable oil pressure to be established within the region of these bearings. Oil ducts are provided in the shaft comprising a diametrical through hole $m$ located between the inner races, an axial hole $n$ therefrom downwards towards the head part, and a second diametrical through hole $o$, the ends of which emerge at the small end of the head cone. Oil through these passages reaches grooves in the coacting conical bearing surfaces $p$ of the housing, and head of the valve member. On the shaft $e$ above the collar $l$ aforesaid, is keyed or splined a skew gear wheel $q$, whilst above that is the inner race $k^1$ of the upper ball race, above which is a washer $r$ and a strong coil spring $s$, secured by a locking washer $t$ and nut $t^1$ on the extreme end of the shaft $e$. The skew gear wheel $q$, inner ball race $k^1$ and washer $r$, are all made a good but easy sliding fit on the shaft $e$, so that the pressure obtainable from the spring $s$ which may conveniently be 100 lbs., may act to pull the valve head $a$ resiliently up into its coacting conical bearing surface $p$. The valve member V rotates around the axis A, and is usually mounted over a piston P reciprocable in the cylinder C. A chamber B is formed in the cylinder between the piston and the valve member, in which a fluid under pressure exerts a force or load against the valve member.

In assembly, the valve is assembled dry, that is, without lubricant on the head $a$, into its housing and the lower spacing ring $f^2$ at the outer races of the conical bearing is selected of such thickness, that appreciable rubbing contact at the conical faces of $b$ against the coacting conical face $p$, can be felt to occur when loaded axially to approximate maximum working loads, which can be obtained by tightening the nut $t^1$. After the correct ring has been found, the nut can be reset for the required spring loading. After assembly, lubricant can easily be induced to enter between the conical faces.

Lubricating oil grooves may be provided for the conical surface of the rotary valve member, and are preferably of the known type, having an inclined trailing edge or corner, so that some of the lubricant is drawn in between the surfaces to be lubricated in known manner with such grooves and at high pressure.

Thus, in operation, there is an effective oil film between the coacting conical surfaces $p$ of the valve head $a$ and its conical housing, and the normal working pressures in chamber B are carried partly on such oil film, but mainly on the races $f$ and $f^1$ of the lower conical roller bearing. During peak pressures, the normal yield of the races $f$ and $f^1$ and of the roller bearings between them, though extremely small, is collectively greater than the yield of the oil film between the coacting conical valve surfaces, and thus as the load on the valve increases the valve member moves axially and a progressively greater proportion of such load increase is taken by the oil film at the coacting conical bearing surfaces, so that the roller thrust bearing is protected from being overloaded. In this manner, frictional losses are reduced to a minimum, as the anti-friction roller bearings support the greater part of the normal loads, whilst the higher frictional losses during the periods of maximum pressures are only during short periods.

Such combination of tapered bearing surfaces with an oil film and an anti-friction thrust bearing, has been proved by me in practice to be entirely satisfactory, especially with conical roller bearings, and it has been found that if properly designed as regards their relative sizes, and properly assembled in the first place so that the load distribution is correct, no adjustment for wear is necessary. During one prolonged test it was found for instance that even where the wear was sufficient to produce axial lifting of the valve member as much as 10 thousandths of an inch, both the coacting conical bearing surfaces and the roller bearing surfaces were in excellent condition. Furthermore, it must be appreciated that the spring $s$, on the end of the valve member shaft ensures that the conical roller bearings are always maintained in mutual adjustment to take up wear, because, as the valve member shaft rises with wear so the inner race $g$ of the upper conical roller bearing is forced down, the shaft $e$ to take up any but the necessary working clearance.

As shown in Fig. 2, the valve member 5 has a head 10 mounted to rotate about its axis 6 in the coacting conical surfaces 11 of the head and housing 19, whilst on its stem 12 are carried the inner races 13 and 14 of two conical roller bearings arranged in the same instead of in opposite directions. Axial pressure on the bearings is maintained by a spring 15, secured by a nut 16, acting through an upper ball bearing 17, carried in a shell 18, secured to the housing 19, and having a shoulder 20 to support the ball bearing. In this arrangement some small lateral movement or flutter of the valve is possible. The chamber 7 is formed between the valve member 5 and the piston 8, and the working pressure on the fluid in the chamber, is exerted on the valve member causing it to be moved in its axial direction.

Figure 3:
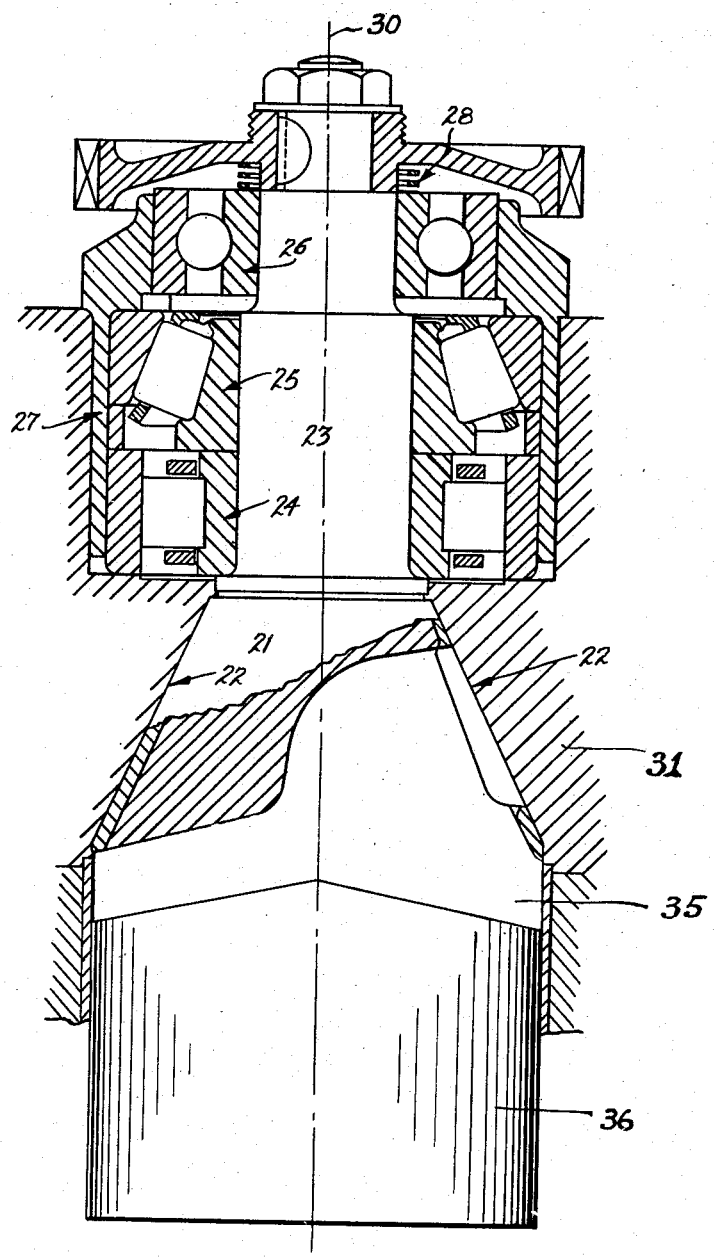
Fig. 3 shows a further modified construction.

As shown in Fig. 3 the valve member 21 is mounted to rotate about its axis 30 in the coacting conical surfaces 22 of the head 21 and the housing 31, and on its stem 23 it carries inner races 24, 25 and 26 of a roller bearing, conical roller thrust bearing and ball bearing respectively. All the outer races of these bearings are carried in a shell 27. Axial pressure on the conical thrust bearing and the coacting conical faces, is maintained by means of the spring 28 acting through the bearing race 26 through which the shaft 23 is slidable. In this arrangement, the valve is very firmly located, against flutter or loss of axial alignment within its housing. The chamber 35 is formed between the valve member and the piston 36, and the working pressure on the fluid in the chamber is exerted on the valve member causing it to be moved in its axial direction.

The invention is obviously not limited to the details of the examples above given, as obviously the proportions, size and angles are capable of variation without departing from the nature of the invention. Clearly, the effective combined action of the two kinds of bearings, plain oil film and anti-friction roller or ball, is very dependent upon many features of construction and design, and particularly upon the resilience of the materials used in the construction of the valve member and valve housing, the distance or length of valve stem between the valve head and the anti-friction bearing, the angle of the conical valve surfaces, and the natural resiliency of the anti-friction bearing under normal load, which, of course, will depend upon the materials of its construction and the angles of its conical races, of which standard types are already obtainable with angles between 15 and 45 degrees. More important still is probably the return axial movement of the valve member by the thrust bearing when the peak load falls, as this enables the lubrication film between the coacting conical or tapered bearing surfaces to be restored to normal thickness, and allows the lubricant to be distributed and losses made up. Probably a different angle of conical bearing surfaces would be required in some cases, to permit more or less axial movement under normal load. Proper initial adjustment as well as design are both necessary for full and efficient advantage to be obtained from the combination of the two types of bearings, namely anti-friction and lubricant film bearings respectively.

It is to be appreciated that during the induction period, very low-working loads occur and when the throttle is closed, negative pressures may occur and the coil spring is required to resist downward pull on the valve.

The strength of the spring on the end of the shaft is therefore determined, not only by the sliding fit resistance of the upper inner conical roller bearing race which it should be able to overcome in order to keep the valve against its other bearings, but also upon the downward forces which it must resist under working conditions. The partial vacuum for example in a high compression engine say 12 to 1 compression ratio, and with a valve of the dimensions given above, has been found to require a spring giving about 100 lbs. pressure. This spring may be short and of high rating, such as to be practically a spring washer, adjusted until almost flattened.

The upper conical roller thrust bearing may be replaced by a ball thrust bearing to take the pull of the coil spring. Conveniently a plain bearing may also be combined with the ball thrust bearing, to act as a steady for the valve member shaft, and having also the advantage of providing an oil seal replacing the flange previously provided above the lower conical thrust bearing for maintaining oil pressure at the lower conical thrust bearing and at the coacting conical bearing surfaces.

What I claim is:

1. A rotary valve assembly comprising a rotary valve member and bearings therefor including coacting tapered bearing surfaces and an anti-friction thrust bearing, means for providing an oil film between the coacting tapered bearing surfaces, the said bearings being relatively set so that a load acting on the valve member is always divided between the oil film and the anti-friction thrust bearing, the anti-friction thrust bearing being more yielding than the oil film, so that as the valve member moves axially with increase of load a progressively increasing proportion of such load increase is taken by the oil film.

2. A rotary valve assembly according to claim 1, characterised in that the axial movement of the valve on maximum load, is less than a predetermined maximum safe axial compression of the thrust bearing.

3. A rotary valve assembly according to claim 1, characterised in that the bearings are set so that the anti-friction bearing takes the greater portion of the normal load.

4. A rotary valve assembly having a rotary valve member mounted in a housing over a chamber in which a fluid under pressure acts against a working piston and against the valve member, which comprises a valve member having a conical head constructed to effect bearing engagement with a conical surface of the housing, a stem portion on the valve member, said valve member having an axis through the conical head and the stem portion around which the valve member rotates, the pressure on the valve member acting to move the valve member in the direction of the axis, a slightly yieldable thrust bearing mounted in the housing and in operative engagement with the stem portion, said housing, valve member and thrust bearing being so constructed and arranged that when no fluid pressure is exerted upon the valve member a sufficient clearance is provided between the conical head and the conical surface of the housing to provide for an oil film, and when the pressure of the fluid increases to a relatively high pressure the thrust bearing yields due to its resiliency and permits the valve member to move in its axial direction and to distribute an increased portion of the load on the film of oil.

5. A rotary valve assembly having a rotary valve member mounted in a housing over a chamber in which a fluid under pressure acts against a working piston and against the valve member, which comprises a valve member having a conical head constructed to effect bearing engagement with a conical surface of the housing, a stem portion on the valve member, said valve member having an axis through the conical head and the stem portion around which the valve member rotates, the pressure on the valve member acting to move the valve member in the direction of the axis, a thrust bearing mounted in the housing and in operative engagement with the stem portion, said thrust bearing being sufficiently resilient to force the valve member in the direction of its axis when the pressure is low a sufficient distance to provide space for an oil film between the conical surface of the housing and the conical head, and when the pressure increases to a relatively high pressure the thrust bearing yields permitting the valve member to move in the direction of its axis against the oil film and to distribute the load between the oil film and the thrust bearing.

6. In a rotary valve assembly for engines, pumps and the like, the improvement which comprises a rotary valve member having a tapered head and a stem rotatable about an axis through the head and stem, a housing having a tapered surface in which the tapered head is mounted forming coacting tapered bearing surfaces, means for exerting a working pressure on the rotary valve member, resilient means supporting the rotary valve member in the housing permitting it to move slightly in its axial direction due to changes in the said pressure, and arranged to establish bearing pressure at the coacting tapered surfaces, a resilient thrust bearing arranged to give bearing contact to the valve member, means for maintaining an oil film between the coacting tapered surfaces, said thrust bearing being sufficiently resilient and so arranged with respect to the valve member and the coacting tapered bearing surfaces, that when the pressure on the valve member becomes relatively high the valve member moves axially, the load being distributed between the thrust bearing and the oil film, and when the pressure decreases becoming relatively low, the valve member is moved in the opposite axial direction at which time the load is carried largely by the thrust bearing.

FRANK METCALF ASPIN.